(12) United States Patent
Lu et al.

(10) Patent No.: US 12,369,171 B2
(45) Date of Patent: Jul. 22, 2025

(54) SYSTEM PARAMETERS TRANSMISSION SCHEME IN WIRELESS COMMUNICATIONS

(71) Applicant: MediaTek Singapore Pte. Ltd., Singapore (SG)

(72) Inventors: Kai Ying Lu, San Jose, CA (US); Yongho Seok, San Jose, CA (US); James Chih-Shi Yee, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 214 days.

(21) Appl. No.: 17/825,116

(22) Filed: May 26, 2022

(65) Prior Publication Data

US 2022/0386301 A1    Dec. 1, 2022

Related U.S. Application Data

(60) Provisional application No. 63/247,346, filed on Sep. 23, 2021, provisional application No. 63/234,733, (Continued)

(51) Int. Cl.
*H04W 72/27* (2023.01)
*H04W 8/00* (2009.01)
*H04W 72/0446* (2023.01)
*H04W 84/12* (2009.01)

(52) U.S. Cl.
CPC ........... *H04W 72/27* (2023.01); *H04W 8/005* (2013.01); *H04W 72/0446* (2013.01); *H04W 84/12* (2013.01)

(58) Field of Classification Search
CPC ............ H04W 72/27; H04W 72/0446; H04W 8/005; H04W 84/12; H04W 84/18; H04W 48/12; H04W 48/16; H04W 48/08
See application file for complete search history.

(56) References Cited

U.S. PATENT DOCUMENTS

2014/0064128 A1* 3/2014 Park .................... H04W 48/12
                                                                370/252
2021/0014911 A1* 1/2021 Patil ..................... H04W 12/73
(Continued)

FOREIGN PATENT DOCUMENTS

EP          4167648 A1     4/2023
EP          4167648 A8     5/2023
(Continued)

OTHER PUBLICATIONS

European Patent Office, Extended European Search Report for European Patent Application No. 22176142.2, Oct. 4, 2022.
(Continued)

*Primary Examiner* — Meng Vang
*Assistant Examiner* — Hector Reyes
(74) *Attorney, Agent, or Firm* — Andy M. Han; Han IP PLLC

(57) ABSTRACT

A station (STA) receives an indication from a first access point (AP) on one of a plurality of links that is not a non-primary link among the plurality of links comprising at least a primary link and the non-primary link. Based on the indication, the STA determines that: (i) the first AP is affiliated with a non-simultaneous-transmit-and-receive (NSTR) AP multi-link device (MLD), and (ii) a second AP, as a neighbor AP of the first AP, is affiliated with the NSTR AP MLD and is operating on the non-primary link.

14 Claims, 7 Drawing Sheets

Related U.S. Application Data filed on Aug. 19, 2021, provisional application No. 63/211,577, filed on Jun. 17, 2021, provisional application No. 63/195,204, filed on Jun. 1, 2021.

(56) References Cited

U.S. PATENT DOCUMENTS

| | | | | |
|---|---|---|---|---|
| 2021/0314846 A1* | 10/2021 | Chu | ............... | H04W 40/244 |
| 2022/0174536 A1* | 6/2022 | Kwon | ............... | H04W 28/0268 |
| 2022/0174768 A1* | 6/2022 | Kim | ............... | H04L 5/0048 |
| 2023/0232315 A1* | 7/2023 | Chitrakar | ............... | H04W 48/16 |
| | | | | 370/329 |
| 2024/0064837 A1* | 2/2024 | Kim | ............... | H04L 5/0094 |

FOREIGN PATENT DOCUMENTS

| | | | |
|---|---|---|---|
| WO | WO 2018232138 A1 | 12/2018 | |
| WO | WO 2021091231 A1 | 5/2021 | |

OTHER PUBLICATIONS

Abhishek Patil (Qualcomm); "MLO: Discovery and beacon-bloating", IEEE Draft; 11-20-0356-03-00BE-MLO-Discovery-and-Beacon-Bloating, IEEE-SA Mentor, Piscataway, NJ USA, vol. 802.11 EHT; 802.11be, No. 3; Jun. 10, 2020, pp. 1-16, XP068169516.
Guogang Huang (Huawei); "CR for Power Save of NSTR Mobile AP MLD", IEEE Draft; 11-22-0356-00-00BE-CR-for-Power-Save-of-NSTR-Mobile-AP-MLD, IEEE-SA Mentor, Piscataway, NJ USA, vol. 802.11 EHT; 802.11be; Feb. 18, 2022, pp. 1-7, XP068189005.
Abhishek Patil (Qualcomm); "MLO: Signaling of critical updates", IEEE Draft; 11-20-0586-10-00BE-MLO-Signaling-of-Critical-Updates, IEEE-SA Mentor; Piscataway, NJ USA, vol. 802.11 EHT; 802.11be, No. 10; Dec. 1, 2020, pp. 1-21, XP068175315.
Edward Au (Huawei); "Compendium of straw polls and potential changes to the Specification Framework Document", IEEE Draft; 11-20-0566-95-00BE-Compendium-of-Straw-Polls-and-Potential-Changes-to-The-Specification-Framework-Document, IEEE-SA Mentor, Piscataway, NJ USA, vol. 802.11 EHT; 802.11BE, No. 95; Nov. 19, 2020, pp. 1-274, XP068175223.
Taiwan Intellectual Property Office, Office Action in Taiwan Patent Application No. 111120411, Feb. 24, 2023.
IEEE P802.11 Wireless LANs "CR for CIDs related to NSTR Capability signalling", IEEE 802.11-21/0222r10.
IEEE P802.11 Wireless LANs "TBD and CR for BSS parameter critical update procedure", IEEE 802.11-21/0621r1.
European Patent Office, Communication pursuant to Article 94(3) EPC, Feb. 10, 2025.

* cited by examiner

200

(A)

| BSSID | MLD PARAMETERS |
|---|---|
| 6 OCTETS | 3 OCTETS |

(B)

| TBTT INFORMATION LENGTH SUBFIELD VALUE | TBTT INFORMATION FIELD CONTENTS |
|---|---|
| 25 | BSSID SUBFIELD + MLD PARAMETERS SUBFIELD |
| 3 | MLD PARAMETERS SUBFIELD |

(C)

| TBTT INFORMATION LENGTH SUBFIELD VALUE | TBTT INFORMATION FIELD CONTENTS |
|---|---|
| 3 | MLD PARAMETERS SUBFIELD |
| 4 | MLD PARAMETERS SUBFIELD + BSS PARAMETERS SUBFIELD |
| 9 | MLD PARAMETERS SUBFIELD + BSSID SUBFIELD |

(D)

| B0~B3 | B4 | B5~B6 | B7~B11 | B12 | B13~B15 |
|---|---|---|---|---|---|
| MAXIMUM NUMBER OF SIMULTANEOUS LINKS | SRS SUPPORT | TID-TO-LINK MAPPING NEGOTIATION SUPPORTED | FREQUENCY SEPARATION FOR STR | NSTR AP MLD SUPPORT | RESERVED |

FIG. 2

| MLD ID | Link ID | BSS Parameters Change Count | Reserved |
|---|---|---|---|
| 8 bits | 4 bits | 8 bits | 4 bits |

FIG. 3

| TBTT Information Length Subfield Value | TBTT Information Field Contents |
|---|---|
| 3 | MLD Parameters Subfield |
| 9 | BSSID Subfield + MLD Parameters Subfield |
| Other values are reserved | |

SYSTEM PARAMETERS TRANSMISSION SCHEME IN WIRELESS COMMUNICATIONS

CROSS REFERENCE TO RELATED PATENT APPLICATION

The present disclosure is part of a non-provisional patent application claiming the priority benefit of U.S. Provisional Patent Application Nos. 63/195,204, 63/211,577, 63/234,733 and 63/247,346, filed 1 Jun. 2021, 17 Jun. 2021, 19 Aug. 2021 and 23 Sep. 2021, respectively, the contents of which being incorporated by reference in their entirety.

TECHNICAL FIELD

The present disclosure is generally related to wireless communications and, more particularly, to system parameters transmission scheme in wireless communications.

BACKGROUND

Unless otherwise indicated herein, approaches described in this section are not prior art to the claims listed below and are not admitted as prior art by inclusion in this section.

In wireless networks such as a wireless local area network (WLAN) operating in accordance with the Institute of Electrical and Electronics Engineers (IEEE) 802.11 standard(s), a multi-link device (MLD) is a device that supports multi-link operation yet is susceptible to in-device coexistence (IDC) interference when two or more of the multiple links are close to each other. The MLD operating on two links with IDC interference cannot support simultaneous transmission and reception on the two links, which are referred to as a non-simultaneous-transmit-and-receive (NSTR) pair of links. In such cases, the MLD is referred to as an NSTR MLD. An access point (AP) MLD that has IDC interference and operates on an NSTR pair of links is referred to as an NSTR AP MLD. An NSTR AP MLD may designate one link of an NSTR link pair as a primary link with the other link of the NSTR link pair being a non-primary link or secondary link. The NSTR AP MLD may transmit Beacon and Probe Response frames on the primary link but not on the non-primary link, and there are challenges as a result of this requirement. For example, how a non-AP MLD can discover an NSTR AP MLD so that the non-AP MLD can determine whether to associate with the AP MLD and set up a multi-link operation on the NSTR link pair remains an issue to be resolved. Moreover, how can a station (STA) obtain updated basic service set (BSS) parameters of the non-primary link when there is a critical update of the BSS operating parameters is another issue to be resolved. Therefore, there is a need for a solution of system parameters transmission scheme in wireless communications to address aforementioned issues.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to system parameters transmission scheme in wireless communications. Under various proposed schemes in accordance with the present disclosure, it is believed that aforementioned issues may be addressed or otherwise alleviated.

In one aspect, a method may involve a STA affiliated with a non-AP MLD receiving an indication from a first AP on one of a plurality of links that is not a non-primary link among the plurality of links comprising at least a primary link and the non-primary link. The method may also involve the non-AP MLD determining based on the indication that: (i) the first AP is affiliated with a NSTR AP MLD, and (ii) a second AP is affiliated with the NSTR AP MLD and is operating on the non-primary link.

In another aspect, a method may involve a first AP generating a beacon frame or a probe response frame containing an indication. The method may also involve the first AP transmitting the beacon frame or the probe response frame to a STA affiliated with a non-AP MLD on one of a plurality of links that is not a non-primary link among the plurality of links comprising at least a primary link and the non-primary link such that, based on the indication contained in the beacon frame or the probe response frame, the STA determines that: (i) the first AP is affiliated with a NSTR AP MLD, and (ii) a second AP is affiliated with the NSTR AP MLD and is operating on the non-primary link.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, WiMax, Bluetooth, ZigBee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 2 is a diagram of example designs in accordance with the present disclosure.

FIG. 3 is a diagram of an example design in accordance with the present disclosure.

FIG. 4 is a diagram of an example scenario in accordance with the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to system parameters transmission scheme in wireless communications. According to the present disclosure, a number of possible solutions may be implemented separately or jointly. That is, although these possible solutions may be described below separately, two or more of these possible solutions may be implemented in one combination or another.

Figure 1:
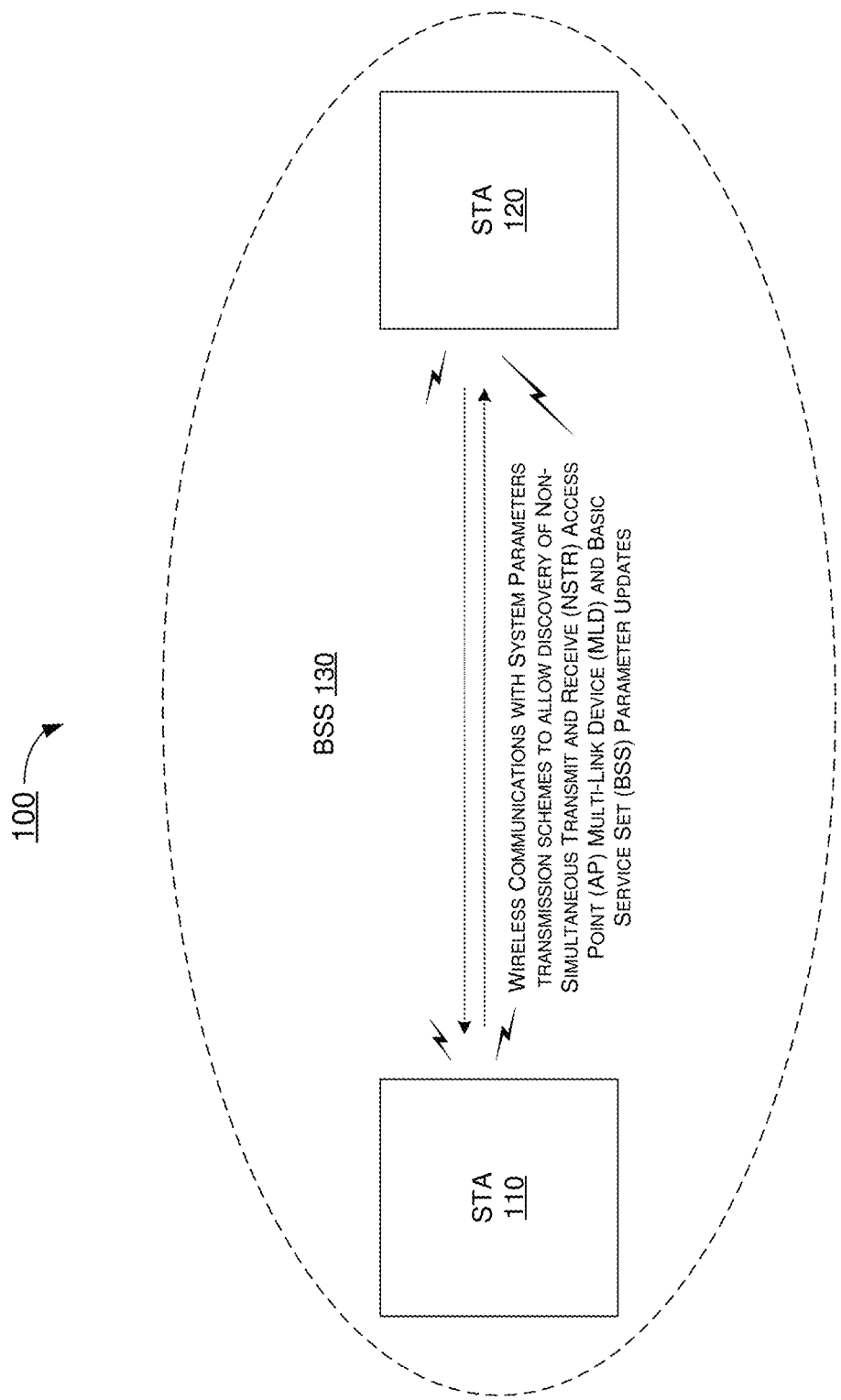
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 7 illustrate examples of implementation of various proposed schemes in network environment 100 in accordance with the present disclosure. The following description of various proposed schemes is provided with reference to FIG. 1~FIG. 7. Referring to FIG. 1, network environment 100 may involve at least a first communication entity (denoted herein as STA 110 and in FIG. 1) and a second communication entity (denoted herein as STA 120 and in FIG. 1) communicating wirelessly with each other in a BSS 130 in accordance with one or more IEEE 802.11 standards (e.g., IEEE 802.11be and beyond). At least one of STA 110 and STA 120 may be an AP STA affiliated with a NSTR AP MLD, while the other one of STA 110 and STA 120 may be a non-AP STA affiliated with a non-AP MLD or a legacy device. Each of STA 110 and STA 120 may be configured to utilize system parameters transmission scheme in wireless communications in accordance with various proposed schemes, as described below.

Under a proposed scheme in accordance with the present disclosure with respect to discovery of an NSTR AP MLD (e.g., by a non-AP MLD or another AP MLD), an AP (herein interchangeably referred to as the "reporting AP") affiliated with an NSTR AP MLD and operating on a link that is not a non-primary link may indicate that it is affiliated with a NSTR MLD by including an indicator in a Basic Variant Multi-Link element in a Beacon frame or a Probe Response frame that it transmits. The Basic Variant Multi-Link element may only contain common information of the MLD. Moreover, the AP may also indicate that it has a neighbor AP (herein interchangeably referred to as the "reported AP") that is affiliated with the same NSTR AP MLD and operating on a non-primary link. Specifically, the AP may indicate so by including a "Reduced Neighbor Report" element in a Beacon frame or a Probe Response frame that it transmits. For instance, the AP may include a neighbor AP Information field in the "Reduced Neighbor Report" element with an indicator that the reported neighbor AP is operating on a non-primary link. This indicator may be a specific-type indication or a special-length of content indication, or both.

FIG. 2 illustrates example designs 200 under a proposed scheme in accordance with the present disclosure. In the "Reduced Neighbor Report" element, the reporting AP (which is operating on the primary link) may include a Neighbor AP Information field for a neighbor AP that is affiliated with an NSTR AP MLD and operating on the non-primary link. Under the proposed scheme, there may be several options in implementing the Neighbor AP Information field. Parts (A), (B), (C) and (D) of FIG. 2 show example designs under a first option (Option 1), second option (Option 2), third option (Option 3) and fourth option (Option 4), respectively.

Referring to part (A) of FIG. 2, under Option 1, the Neighbor AP Information field may include a specific Target Beacon Transmission Time (TBTT) Information Field Type subfield to indicate that the reported AP is affiliated with an NSTR AP MLD and is operating on the non-primary link of an NSTR link pair. For instance, a TBTT Information Field Type subfield may be set to 1 when the reported neighbor AP is operating on a non-primary link of an NSTR link pair. Otherwise, the TBTT Information Field Type subfield may be set to 0 when the reported neighbor AP is not affiliated with an NSTR AP MLD or when the reported neighbor AP is affiliated with an NSTR AP MLD but is not operating on a non-primary link. Under the proposed scheme, when the TBTT Information Field Type subfield is set to 1, it identifies, together with a TBTT Information Length subfield, the format of the TBTT Information Field for the reported AP operating on the non-primary link. For instance, in case the TBTT Information Length subfield is set to 9 (e.g., 9 octets), the TBTT Information Field content may include the following information: a basic service set identifier (BSSID) subfield, which may have a length of 6 octets, and an MLD parameters subfield, which may have a length of 3 octets. Moreover, the TBTT Information Field content may not include a neighbor AP TBTT offset subfield.

Referring to part (B) of FIG. 2, under Option 2, the Neighbor AP Information field may include the TBTT Information Field with a specific length value to indicate that the reported AP is affiliated with an NSTR AP MLD and operating on the non-primary link of the NSTR link pair. For instance, the TBTT Information Length subfield may be set to a specific or predefined value (e.g., 3, 25), and the TBTT Information Field Type subfield may be set to 0.

When the TBTT Information Length subfield is set to the specific value (e.g., 25 in one example), the TBTT Information Field content may contain the following information: the BSSID subfield and the MLD parameters subfield. The TBTT Information Field content may not include the Neighbor AP TBTT Offset subfield. The TBTT Information Field contents may be of a total length of 9 octets when the Length subfield is set to 25, which means the TBTT Information Length subfield value is mapped to a specific TBTT Information field content.

When the TBTT Information Length subfield is set to the specific value (e.g., 3 in another example), the TBTT Information Field content may contain the MLD parameters subfield only. The TBTT Information Field content may not include the Neighbor AP TBTT Offset subfield. The TBTT Information Field content may be of a length of 3 octets when the Length subfield is set to 3, which means the TBTT Information Length subfield is mapped to the number of octets of the TBTT Information Field contents.

Referring to part (C) of FIG. 2, under Option 3, the Neighbor AP Information field may include the TBTT Information Field with a specific TBTT Information Field Type and a specific TBTT Information Length subfield value to indicate that the reported AP is affiliated with an NSTR AP MLD and operating on the non-primary link of the NSTR link pair. For instance, the TBTT Information Field Type subfield may be set to a specific or predefined value (e.g., 1), and the TBTT Information Length subfield may be set to one or more specific values. When the TBTT Information Field Type is set to 1 and the TBTT Information Length subfield value is set to 3, the TBTT Information Field contents may contain the MLD parameters subfield. When the TBTT Information Field Type is set to 1 and the TBTT Information Length subfield value is set to other specific value, the TBTT Information Field contents may contain at least the MLD parameters subfield.

Referring to part (D) of FIG. 2, under Option 4, an AP affiliated with an NSTR AP MLD and not operating on the non-primary link may indicate that it supports, belongs to, or otherwise is co-located with an NSTR AP MLD by carrying a bit indication of "NSTR AP MLD support" or "NSTR AP MLD Type" in an MLD Capabilities subfield of a Multi-Link element in a Beacon frame or Probe Response frame that it transmits. The Neighbor AP Information field (e.g., as described above with respect to Option 1, Option 2 or Option 3) of a reported AP may include the TBTT Information Field with a specific TBTT Information Field Type or a specific TBTT Information Length subfield value, or both, to indicate that the reported AP is affiliated with an NSTR AP MLD and operating on the non-primary link of the NSTR link pair. For instance, the TBTT Information Field Type subfield may be set to a specific value (e.g., 1), and the TBTT Information Length subfield may be set to one or more specific values. Moreover, the TBTT Information Field content corresponding to the reported AP operating on the non-primary link may contain the MLD parameters subfield.

Under a proposed scheme in accordance with the present disclosure with respect to discovery of an NSTR AP MLD (e.g., by a non-AP MLD or another AP MLD), a non-AP MLD may be able to discover an NSTR AP MLD when the non-AP MLD receives from an AP a Beacon frame or a Probe Response frame that is not a Multi-Link (ML) Probe Response, indicating that the AP is affiliated with an AP MLD and the reported neighbor AP is affiliated with an NSTR AP MLD and operating on a non-primary link of an NSTR link pair. Under the proposed scheme, the non-AP MLD may be able to infer the reported neighbor AP on the non-primary link affiliated with the NSTR AP MLD by decoding the Neighbor AP Information field under one or more options in the Reduced Neighbor Report element. Under a first option (Option 1) which may be an implicit approach, the non-AP MLD may infer the reported neighbor AP on the non-primary link affiliated with the NSTR AP MLD by decoding the Neighbor AP Information field with the TBTT Information Field Type subfield set to a specific value (e.g., 1). Under a second option (Option 2) which may be an implicit approach, the non-AP MLD may infer the reported neighbor AP on the non-primary link affiliated with the NSTR AP MLD by decoding the Neighbor AP Information field with the TBTT Information Field length value set to a specific value (e.g., 3 or 25). Under a third option (Option 3) which may be an implicit approach, the non-AP MLD may infer the reported neighbor AP on the non-primary link affiliated with the NSTR AP MLD by decoding the Neighbor AP Information field with the TBTT Information Field Type subfield set to a specific value (e.g., 1) and TBTT Information Field length value set to a specific value (e.g., 3, 4, 9 or another value). Under a fourth option (Option 4) which may be an explicit approach, an NSTR AP MLD may support indication in a Multi-Link element of a Beacon frame or Probe Response frame and non-primary link indication in the Neighbor AP Information field with Option 1 or Option 2 or Option 3 described above.

Under a proposed scheme in accordance with the present disclosure with respect to discovery of an NSTR AP MLD, a ML Probe Request may be utilized to allow a non-AP STA to request an AP affiliated with an NSTR AP MLD and not operating on the non-primary link to include the complete or partial set of capabilities, parameters and operation elements of the other AP affiliated to the same AP MLD as the AP and operating on the non-primary link. Under the proposed scheme, none of the non-AP STA(s) affiliated with a non-AP MLD may send an ML Probe Request to an AP of an NSTR AP MLD on the non-primary link.

Under a proposed scheme in accordance with the present disclosure with respect to a BSS parameters update procedure, an AP affiliated with an NSTR AP MLD and not operating on the non-primary link may indicate a BSS parameter critical update using a BSS Parameters Change Count subfield in the Neighbor AP Information field of the Reduced Neighbor Report element for the neighbor AP that is affiliated with the same NSTR AP MLD and operating on the non-primary link. For instance, the AP may indicate a BSS parameter critical update upon occurrence of a critical update to the BSS operating parameters of the reported neighbor AP affiliated with the NSTR AP MLD and operating on the non-primary link.

Under the proposed scheme, a non-AP MLD associated with a NSTR AP MLD may maintain a record of a value of the most-recently received BSS Parameters Change Count subfield for each AP in the NSTR AP MLD with which it has multi-link setup. Additionally, a non-AP STA affiliated with the non-AP MLD and not operating on the non-primary link (e.g., primary link) may maintain a record of a value of the most-recently received BSS Parameters Change Count subfield corresponding to the AP affiliated with the NSTR AP MLD and operating on the non-primary link and may be able to obtain the updated BSS parameters of the AP affiliated with the NSTR AP MLD and operating on the non-primary link by sending an ML Probe Request to the reporting AP that is affiliated with the NSTR AP MLD and not operating on the non-primary link. Moreover, a non-AP STA affiliated with a non-AP MLD may not send a Probe Request (e.g., an ML Probe Request or another type of probe request) to the reported AP that is affiliated with the NSTR AP MLD and operating on the non-primary link to obtain the updated BSS parameters of the reported AP on the non-primary link.

FIG. 3 illustrates an example design 300 under a proposed scheme in accordance with the present disclosure. Referring to FIG. 3, design 300 may pertain to the design of an MLD Parameters subfield in the Neighbor AP Information field. The Neighbor AP Information field may include an MLD ID subfield, a Link ID subfield, a BSS Parameters Change Count subfield, and a Reserved subfield. The value in the BSS Parameters Change Count subfield may be an unsigned integer (e.g., initialized to 0) and may be incremented upon occurrence of a critical update to the per-STA profile or BSS parameters of the reported AP affiliated with an NSTR AP MLD and operating on the non-primary link.

In a first example implementation of one or more of the proposed schemes with respect to NSTR AP MLD discovery, an AP affiliated with an NSTR AP MLD and operating on a primary link (or not operating on a non-primary link) of an NSTR link pair may include a Basic Variant Multi-Link element in a Beacon frame or Probe Response frame that it transmits, which is not an ML Probe Response that it transmits. The transmitted Basic Variant Multi-Link element in the Beacon frame or Probe Response frame may include only the Common Information field of the Basic Variant Multi-Link element. The Common Information field may carry information that is common to all the links except for Link ID Information subfield and BSS Parameters Change Count subfield that are for the link on which the Multi-Link element is sent. On the other hand, an AP affiliated with an NSTR AP MLD and operating on the non-primary link of the NSTR link pair may not transmit a Beacon frame or Probe Response frame.

Additionally, in this example, an AP affiliated with an NSTR AP MLD and operating on the primary link (or not operating on the non-primary link) of the NSTR link pair may include a TBTT Information field in a Reduced Neighbor Report element in the Beacon frame and Probe Response frame transmitted by the AP with the TBTT Information Field Type subfield set to 1. When set to 1, the TBTT Information Field Type subfield, together with the TBTT Information Length subfield, identifies the format of the TBTT Information field for the reported AP affiliated with an NSTR AP MLD and operating on the non-primary link. FIG. 4 illustrates an example scenario 400 under a proposed scheme in accordance with the present disclosure. Referring to FIG. 4, in case a value of the TBTT Information Length subfield is 3 bytes, the TBTT Information field content may include the MLD parameters subfield. Moreover, in case a value of the TBTT Information Length subfield is 9 bytes, the TBTT Information field content may include the BSSID subfield and the MLD parameters subfield.

Moreover, in this example, a non-AP MLD may be able to discover an NSTR AP MLD when it receives the Reduced Neighbor Report element carried in a Beacon frame or Probe Response frame that is not an ML Probe Response, transmitted by an AP indicating that a neighbor AP is operating on a non-primary link. The non-AP MLD may also be able to infer the reported AP operating on the non-primary link by decoding the Neighbor AP Information field with TBTT Information Field Type subfield equal to 1 in the Reduced Neighbor Report element. Furthermore, an ML Probe Request may be utilized by a non-AP STA/MLS to request an AP affiliated with an NSTR AP MLD and not operating on the non-primary link to include a complete or partial set of capabilities, parameters and operation elements of the other AP affiliated to the same AP MLD as the AP and operating on the non-primary link. In this example, none of the non-AP STAs of a non-AP MLD may send an ML Probe Request to an AP of an NSTR AP MLD on the non-primary link of the NSTR link pair.

In a second example implementation of one or more of the proposed schemes with respect to NSTR AP MLD discovery, an AP affiliated with an NSTR AP MLD and operating on a primary link (or not operating on a non-primary link) of an NSTR link pair may include a Basic Variant Multi-Link element in a Beacon frame or Probe Response frame that it transmits. The Basic Variant Multi-Link element may include not only the Common Information field but also a per-STA profile of a reported AP affiliated with the same NSTR AP MLD and operating on the non-primary link. The Common Information field may carry information that is common to all the links except for Link ID Information subfield and BSS Parameters Change Count subfield that are for the link on which the Multi-Link element is sent. The per-STA profile may carry complete or partial information of a reported AP affiliated with the same NSTR AP MLD and operating on the non-primary link. On the other hand, an AP affiliated with an NSTR AP MLD and operating on the non-primary link of the NSTR link pair may not transmit a Beacon frame or Probe Response frame.

Additionally, in this example, an AP affiliated with an NSTR AP MLD and operating on the primary link (or not operating on the non-primary link) of the NSTR link pair may include a TBTT Information field in a Reduced Neighbor Report element in the Beacon frame and Probe Response frame transmitted by the AP with the TBTT Information Field Type subfield set to 1. When set to 1, the TBTT Information Field Type subfield, together with the TBTT Information Length subfield, identifies the format of the TBTT Information field for the reported AP affiliated with an NSTR AP MLD and operating on the non-primary link. For instance, in case a value of the TBTT Information Length subfield is 3 bytes, the TBTT Information field content may include the MLD parameters subfield. Moreover, in case a value of the TBTT Information Length subfield is 9 bytes, the TBTT Information field content may include the BSSID subfield and the MLD parameters subfield.

Moreover, in this example, a non-AP MLD supporting operation on the non-primary link may be able to decode a per-STA profile of a reported AP affiliated with an NSTR AP MLD and operating on the non-primary link in a Basic Variant Multi-link element in a Beacon frame or in a Probe Response frame, that is transmitted by an AP affiliated with an NSTR AP MLD and operating on the primary link (or not operating on the non-primary link). The non-AP MLD may also be able to discover an NSTR AP MLD when it receives a Reduced Neighbor Report element carried in a Beacon or a Probe Response frame, transmitted by an AP indicating that a neighbor AP is operating on a non-primary link. The non-AP MLD may further be able to infer the reported AP operating on the non-primary link by decoding the Neighbor AP Information field with TBTT Information Field Type subfield equal to 1 in the Reduced Neighbor Report element. Furthermore, the non-AP MLD may be able to discover an NSTR AP MLD when it receives the per-STA profile of a reported AP carried in a Basic Variant Multi-Link element in a Beacon or a Probe Response frame. The non-AP MLD does not need to send a ML Probe Request to an AP affiliated with an NSTR AP MLD and not operating on the non-primary link to request the complete or partial set of capabilities, parameters and operation elements of the other AP affiliated to the same AP MLD as the AP and operating on the non-primary link. In this example, none of the non-AP STAs of a non-AP MLD may send an ML Probe Request to an AP of an NSTR AP MLD on the non-primary link of the NSTR link pair.

In a third example implementation of one or more of the proposed schemes with respect to NSTR AP MLD discovery, an AP affiliated with an NSTR AP MLD and operating on a primary link (or not operating on a non-primary link) of an NSTR link pair may include a Basic Variant Multi-Link element in a Beacon frame or in a Probe Response frame that it transmits, which is not an ML Probe Response, that it transmits. The Basic Variant Multi-Link element in the Beacon frame or Probe Response frame may include only the Common Information field of the Basic Variant Multi-Link element. The Common Information field may carry information that is common to all the links except for Link ID Information subfield and BSS Parameters Change Count subfield that are for the link on which the Multi-Link element is sent. On the other hand, an AP affiliated with an NSTR AP MLD and operating on the non-primary link of the NSTR link pair may not transmit a Beacon frame or a Probe Response frame.

Additionally, in this example, an AP affiliated with an NSTR AP MLD and not operating on the non-primary link may not include a Beacon Interval subfield or a DTIM Information subfield in the STA Control field of the per-STA profile sub-element corresponding to the AP affiliated with the NSTR AP MLD and operating on the non-primary link. On the other hand, an AP affiliated with an NSTR AP MLD and operating on the primary link (or not operating on the non-primary link) of the NSTR link pair may include a TBTT Information field in a Reduced Neighbor Report element in the Beacon frame and Probe Response frame transmitted by the AP with the TBTT Information Length subfield set to 3 to identify the reported AP affiliated with an NSTR AP MLD and operating on the non-primary link. The TBTT Information field content may include the MLD parameters subfield.

Moreover, in this example, a non-AP MLD may be able to discover an NSTR AP MLD when it receives the Reduced Neighbor Report element carried in a Beacon frame or Probe Response frame that is not an ML Probe Response, transmitted by an AP indicating that a neighbor AP is operating on a non-primary link. The non-AP MLD may also be able to infer the reported AP operating on the non-primary link by decoding the Neighbor AP Information field with TBTT information Field Type subfield equal to 1 in the Reduced Neighbor Report element.

Furthermore, in this example, an ML Probe Request may be utilized by a non-AP STA/MLD to request an AP affiliated with an NSTR AP MLD and not operating on the non-primary link to include the complete or partial set of capabilities, parameters and operation elements of the other AP affiliated to the same AP MLD as the AP and operating on the non-primary link. In this example, the non-AP STAs affiliated with non-AP MLDs which discovered an NSTR AP MLD may not send an ML probe request to the AP affiliated with the NSTR AP MLD and operating on the non-primary link of the NSTR link pair.

In a fourth example implementation of one or more of the proposed schemes with respect to NSTR AP MLD discovery, an AP affiliated with an NSTR AP MLD and operating on a primary link (or not operating on a non-primary link) of an NSTR link pair may include a Basic Variant Multi-Link element in a Beacon frame or in a Probe Response frame that it transmits, which is not an ML Probe Response that it transmits. The Basic Variant Multi-Link element in the Beacon frame or Probe Response frame may include only the Common Information field of the Basic Variant Multi-Link element. The Common Information field may carry information that is common to all the links except for Link ID Information subfield and BSS Parameters Change Count subfield that are for the link on which Multi-Link element is sent. The Common Information field may carry a 'NSTR AP MLD support' indication in the MLD Capabilities subfield to indicate whether the AP MLD is an NSTR AP MLD or not. On the other hand, an AP affiliated with an NSTR AP MLD and operating on the non-primary link of the NSTR link pair may not transmit a Beacon frame or a Probe Response frame.

Additionally, in this example, an AP affiliated with an NSTR AP MLD and not operating on the non-primary link may not include a Beacon Interval subfield or a DTIM Information subfield in the STA Control field of the per-STA profile sub-element corresponding to the AP affiliated with the NSTR AP MLD and operating on the non-primary link. Moreover, an AP affiliated with an NSTR AP MLD and operating on the primary link (or not operating on the non-primary link) of the NSTR link pair may include a TBTT Information field in a Reduced Neighbor Report element in the Beacon frame and Probe Response frame transmitted by the AP with the TBTT Information Length subfield set to 3 to identify the reported AP affiliated with an NSTR AP MLD and operating on the non-primary link. The TBTT Information field content may include the MLD parameters subfield.

Moreover, in this example, a non-AP MLD may be able to discover an NSTR AP MLD when it receives the Reduced Neighbor Report element carried in a Beacon frame or Probe Response frame that is not an ML Probe Response, transmitted by an AP indicating that a neighbor AP is operating on a non-primary link. The non-AP MLD may also be able to infer the reported AP operating on the non-primary link by decoding the Neighbor AP Information field with TBTT information field Type subfield equal to 1 in the Reduced Neighbor Report element. An ML Probe Request may be utilized by a non-AP STA/MLD to request an AP affiliated with an NSTR AP MLD and not operating on the non-primary link to include the complete or partial set of capabilities, parameters and operation elements of the other AP affiliated to the same AP MLD as the AP and operating on the non-primary link. In this example, the non-AP STAs affiliated with non-AP MLDs which discovered an NSTR AP MLD may not send an ML Probe Request to the AP affiliated with the NSTR AP MLD and operating on the non-primary link of the NSTR link pair.

In a first example implementation of one or more of the proposed schemes with respect to BSS parameters update, an AP affiliated with an NSTR AP MLD and operating on a primary link (or not operating on a non-primary link) of an NSTR link pair may indicate a BSS parameter critical update of another AP affiliated with the same NSTR AP MLD and operating on the non-primary link of the NSTR link pair by using the BSS Parameters Change Count subfield in the Neighbor AP Information field of the Reduced Neighbor Report element for the neighbor AP. Additionally, a non-AP MLD may maintain a record of a value of the most recently received BSS Parameters Change Count subfield for each AP in the NSTR AP MLD with which it has multi-link setup. Moreover, a non-AP STA affiliated with a non-AP MLD may only request the updated BSS parameters of the AP affiliated with an NSTR AP MLD and operating on the non-primary link by sending an ML Probe Request to the AP affiliated with the NSTR AP MLD and operating on the primary link (or not operating on the non-primary link).

Additionally, in this example, the AP affiliated with the NSTR AP MLD and operating on the primary link (or not operating on the non-primary link) may transmit an unsolicited broadcast ML Probe Response carrying updated complete or partial per-STA profile of the AP that is operating on the non-primary link. Moreover, the AP affiliated with the NSTR AP MLD and operating on the primary link (or not operating on the non-primary link) may transmit a Beacon frame or Probe Response frame with a Basic Variant Multi-Link element carrying an updated complete or partial per-STA profile of the AP that is operating on the non-primary link.

In a second example implementation of one or more of the proposed schemes with respect to BSS parameters update, an AP affiliated with an NSTR AP MLD and operating on a primary link (or not operating on a non-primary link) of an NSTR link pair may indicate a BSS parameter critical update of another AP affiliated with the same NSTR AP MLD and operating on the non-primary link of the NSTR link pair by using the BSS Parameters Change Count subfield in the Neighbor AP Information field of the Reduced Neighbor Report element for the neighbor AP. Additionally, a non-AP MLD may maintain a record of a value of the most recently received BSS Parameters Change Count subfield for each AP in the NSTR AP MLD with which it has multi-link setup. Moreover, a non-AP STA affiliated with a non-AP MLD may be able to obtain the updated BSS parameters of the AP affiliated with an NSTR AP MLD and operating on the non-primary link by decoding the per-STA profile in a Basic Variant Multi-Link element in a Beacon frame or Probe Response frame transmitted by the AP affiliated with the NSTR AP MLD and operating on the primary link (or not operating on the non-primary link).

Illustrative Implementations

Figure 5:
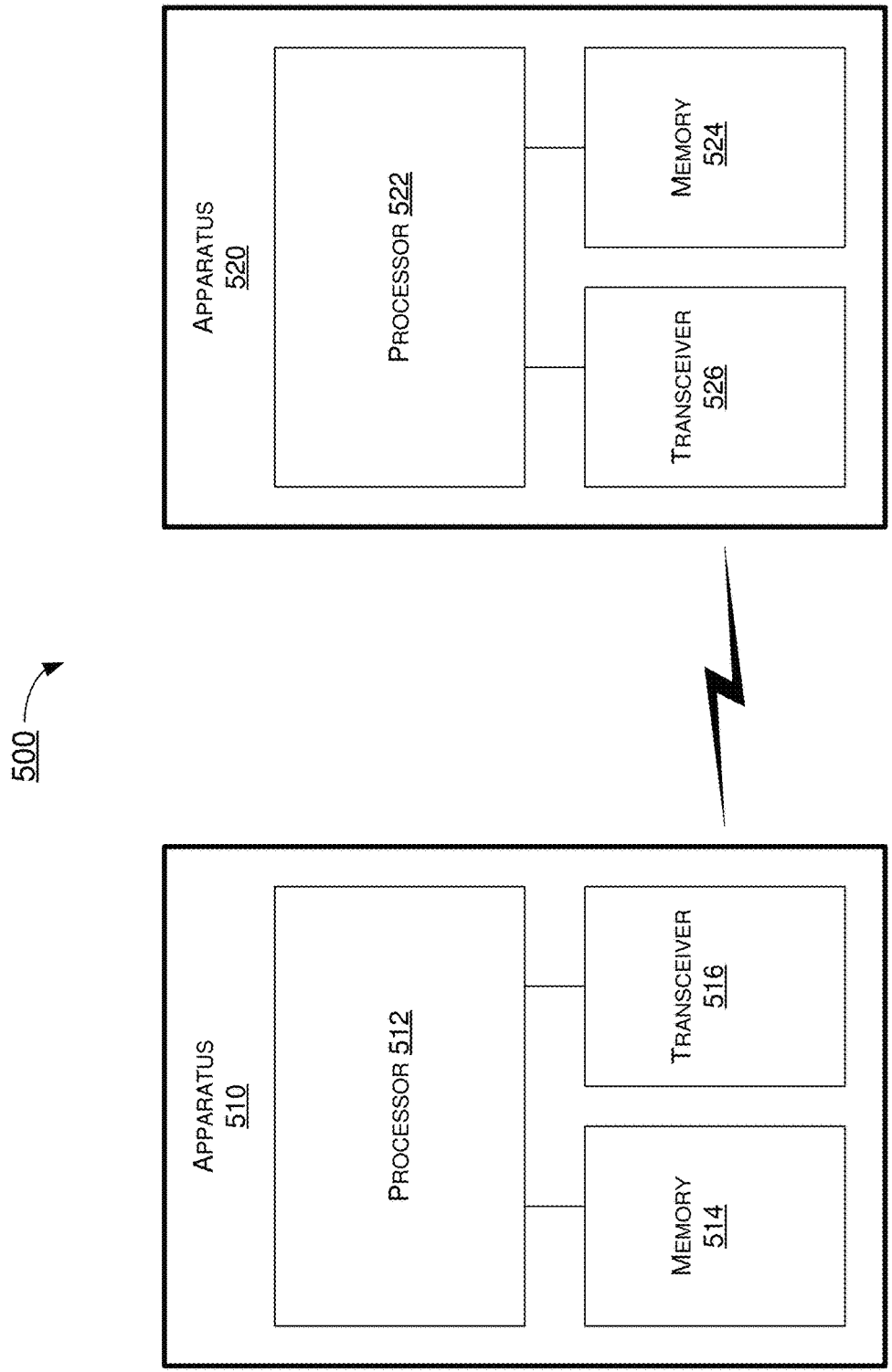
FIG. 5 is a block diagram of an example communication system in accordance with an implementation of the present disclosure.

FIG. 5 illustrates an example system 500 having at least an example apparatus 510 and an example apparatus 520 in accordance with an implementation of the present disclosure. Each of apparatus 510 and apparatus 520 may perform various functions to implement schemes, techniques, processes and methods described herein pertaining to system parameters transmission scheme in wireless communications, including the various schemes described above with respect to various proposed designs, concepts, schemes, systems and methods described above as well as processes described below. For instance, apparatus 510 may be implemented in STA 110 and apparatus 520 may be implemented in STA 120, or vice versa.

Each of apparatus 510 and apparatus 520 may be a part of an electronic apparatus, which may be a non-AP MLD or an AP MLD, such as a portable or mobile apparatus, a wearable apparatus, a wireless communication apparatus or a computing apparatus. When implemented in a non-AP MLD, each of apparatus 510 and apparatus 520 may be implemented in a smartphone, a smart watch, a personal digital assistant, a digital camera, or a computing equipment such as a tablet computer, a laptop computer or a notebook computer. Each of apparatus 510 and apparatus 520 may also be a part of a machine type apparatus, which may be an IoT apparatus such as an immobile or a stationary apparatus, a home apparatus, a wire communication apparatus or a computing apparatus. For instance, each of apparatus 510 and apparatus 520 may be implemented in a smart thermostat, a smart fridge, a smart door lock, a wireless speaker or a home control center. When implemented in or as a network apparatus, apparatus 510 and/or apparatus 520 may be implemented in a network node, such as an AP MLD in a WLAN.

In some implementations, each of apparatus 510 and apparatus 520 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 510 and apparatus 520 may be implemented in or as a non-AP MLD or an AP MLD. Each of apparatus 510 and apparatus 520 may include at least some of those components shown in FIG. 5 such as a processor 512 and a processor 522, respectively, for example. Each of apparatus 510 and apparatus 520 may further include one or more other components not pertinent to the proposed scheme of the present disclosure (e.g., internal power supply, display device and/or user interface device), and, thus, such component(s) of apparatus 510 and apparatus 520 are neither shown in FIG. 5 nor described below in the interest of simplicity and brevity.

In one aspect, processor 512 and processor 522 may be implemented in the form of one or more single-core processors, one or more multi-core processors, one or more RISC processors or one or more CISC processors. That is, even though a singular term "a processor" is used herein to refer to processor 512 and processor 522, processor 512 and processor 522 may include multiple processors in some implementations and a single processor in other implementations in accordance with the present disclosure. In another aspect, processor 512 and processor 522 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 512 and processor 522 is a special-purpose machine specifically designed, arranged and configured to perform specific tasks including those pertaining to system parameters transmission scheme in wireless communications in accordance with various implementations of the present disclosure.

In some implementations, apparatus 510 may also include a transceiver 516 coupled to processor 512. Transceiver 516 may include a transmitter capable of wirelessly transmitting and a receiver capable of wirelessly receiving data. In some implementations, apparatus 520 may also include a transceiver 526 coupled to processor 522. Transceiver 526 may include a transmitter capable of wirelessly transmitting and a receiver capable of wirelessly receiving data.

In some implementations, apparatus 510 may further include a memory 514 coupled to processor 512 and capable of being accessed by processor 512 and storing data therein. In some implementations, apparatus 520 may further include a memory 524 coupled to processor 522 and capable of being accessed by processor 522 and storing data therein. Each of memory 514 and memory 524 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 514 and memory 524 may include a type of read-only memory (ROM) such as mask ROM, programmable ROM (PROM), erasable programmable ROM (EPROM) and/or electrically erasable programmable ROM (EEPROM). Alternatively, or additionally, each of memory 514 and memory 524 may include a type of non-volatile random-access memory (NVRAM) such as flash memory, solid-state memory, ferroelectric RAM (Fe-RAM), magnetoresistive RAM (MRAM) and/or phase-change memory.

Each of apparatus 510 and apparatus 520 may be a communication entity capable of communicating with each other using various proposed schemes in accordance with the present disclosure. For illustrative purposes and without limitation, a description of capabilities of apparatus 510, as STA 110 (e.g., a non-AP MLD operating on a NSTR link pair), and apparatus 520, as STA 120 (e.g., an AP MLD), is provided below. It is noteworthy that, although the example implementations described below are provided in the context of WLAN, the same may be implemented in other types of networks. It is also noteworthy that, although examples described below are provide in the context of apparatus 510, the examples may also be applicable to apparatus 520 or otherwise implemented by apparatus 520.

In one aspect pertaining to system parameters transmission scheme in wireless communications in accordance with the present disclosure, with apparatus 510 implemented in a STA affiliated with a non-AP MLD (e.g., STA 110) and apparatus 520 implemented in a reporting AP or first AP affiliated with a NSTR AP MLD (e.g., STA 120), processor 512 may receive, via transceiver 516, an indication from apparatus 520 (as the first AP) on one of a plurality of links that is not a non-primary link among the plurality of links comprising at least a primary link and the non-primary link. Additionally, processor 512 may determine, based on the indication, that: (i) the first AP is affiliated with a NSTR AP MLD, and (ii) a second AP (as a reported AP) is affiliated with the NSTR AP MLD and is operating on the non-primary link.

In some implementations, in receiving the indication, processor 512 may receive the indication in a beacon frame or a probe response frame.

In some implementations, in determining that the first AP is affiliated with the NSTR AP MLD, processor 512 may determine based on an indication in a common information field of the MLD contained in a Multi-Link element in the beacon frame or the probe response frame.

In some implementations, in determining that the second AP is affiliated with the NSTR AP MLD and is operating on the non-primary link, processor 512 may determine based on an indicator contained in a Neighbor Information field corresponding to the second AP in a Reduced Neighbor Report element in the beacon frame or the probe response frame. In some implementations, the indicator may include a value of a TBTT Information Field Type subfield being set to a specific value (e.g., 1). Alternatively, the indicator may include the value of the TBTT Information Length subfield being set to another specific value (e.g., 3 or 25). Still alternatively, the indicator may include a specific combined value of the TBTT Information Field Type subfield (e.g., 1) and a TBTT Information Field Length (e.g., 3, 4 or 9).

In some implementations, in determining that the first AP is affiliated with the NSTR AP MLD, processor 512 may determine that the first AP is affiliated with the NSTR AP MLD based a bit indication of NSTR AP MLD Support in a MLD Capabilities subfield of a Multi-Link element in the beacon frame or the probe response frame. Moreover, in determining that the second AP is affiliated with the NSTR AP MLD and is operating on the non-primary link, processor 512 may determine that the second AP is affiliated with the NSTR AP MLD and is operating on the non-primary link based on the TBTT Information Field with either or both of a specific TBTT Information Field Type and a specific TBTT Information Length subfield value.

In some implementations, processor 512 may perform additional operations. For instance, processor 512 may transmit, via transceiver 516, a request to the first AP on the one of the plurality of links that is not the non-primary link. Moreover, processor 512 may receive, via transceiver 516, from the first AP a complete or partial set of capabilities, parameters and operation elements of the second AP responsive to the transmitting of the request.

In some implementations, processor 512 may perform additional operations. For instance, processor 512 may receive, via transceiver 516, from the first AP a BSS parameter critical update of the second AP indicating an occurrence of a critical update to BSS parameters of the second AP. Furthermore, processor 512 may maintain a record of a value of a most recently received BSS Parameters Change Count subfield regarding the second AP affiliated with the NSTR AP MLD with which apparatus 510 is associated with the first AP thereof responsive to receiving the BSS parameter critical update.

In some implementations, processor 512 may refrain from sending any ML Probe Request to the second AP to obtain an updated BSS parameter critical update of the second AP in response to determining that the second AP is affiliated with the NSTR AP MLD and is operating on the non-primary link. Additionally, or alternatively, in receiving the BSS parameter critical update of the second AP, processor 512 may receive the BSS parameter critical update responsive to transmitting a ML probe request to the first AP.

In another aspect pertaining to system parameters transmission scheme in wireless communications in accordance with the present disclosure, with apparatus 510 implemented in a non-AP STA (e.g., STA 110) and apparatus 520 implemented in a reporting AP or first AP (e.g., STA 120) affiliated with a NSTR AP MLD, processor 522 may generate a beacon frame or a probe response frame containing an indication. Additionally, processor 522 may transmit, via transceiver 526, the beacon frame or the probe response frame to apparatus 510 (as a STA) affiliated with a non-AP MLD on one of a plurality of links that is not a non-primary link among the plurality of links comprising at least a primary link and the non-primary link such that, based on the indication contained in the beacon frame or the probe response frame, the STA determines that: (i) the first AP is affiliated with a NSTR AP MLD, and (ii) a second AP (as a reported AP) is affiliated with the NSTR AP MLD and is operating on the non-primary link.

In some implementations, the indication may include common information of the MLD contained in a Basic Variant Multi-Link element in the beacon frame or the probe response frame indicating that the first AP is affiliated with the NSTR AP MLD. Additionally, or alternatively, the indication may include an indicator contained in a Reduced Neighbor Report element in the beacon frame or the probe response frame indicating that the second AP is affiliated with the NSTR AP MLD and is operating on the non-primary link.

In some implementations, the indication may include an indicator contained in a Reduced Neighbor Report element in the beacon frame or the probe response frame. In some implementations, the indicator may include a value of a TBTT Information Field Type subfield being set to 1. Alternatively, the indicator may include the value of the TBTT Information Field Length subfield being set to 3 or 25. Still alternatively, the indicator may include the value of the TBTT Information Field Type subfield being set to 1 and a value of a TBTT Information Field Length being set to 3, 4 or 9.

In some implementations, processor 522 may perform additional operations. For instance, processor 522 may receive, via transceiver 526, a request from the STA on the one of the plurality of links that is not the non-primary link. Moreover, processor 522 may transmit, via transceiver 526, to the STA a complete or partial set of capabilities, parameters and operation elements of the second AP responsive to the receiving of the request.

In some implementations, processor 522 may perform additional operations. For instance, processor 522 may determine an occurrence of a critical update to a STA profile of the second AP. Furthermore, processor 522 may transmit, via transceiver 526, to the STA a BSS parameter critical update indicating the occurrence of the critical update to a STA profile of the second AP.

In some implementations, in transmitting the BSS parameter critical update, processor 522 may transmit the BSS parameter critical update in a BSS Parameters Change Count subfield in a Neighbor AP Information field of a Reduced Neighbor Report element regarding the second AP. Additionally, or alternatively, in transmitting the BSS parameter critical update, processor 522 may transmit the BSS parameter critical update responsive to receiving a ML probe request from the STA.

Illustrative Processes

Figure 6:
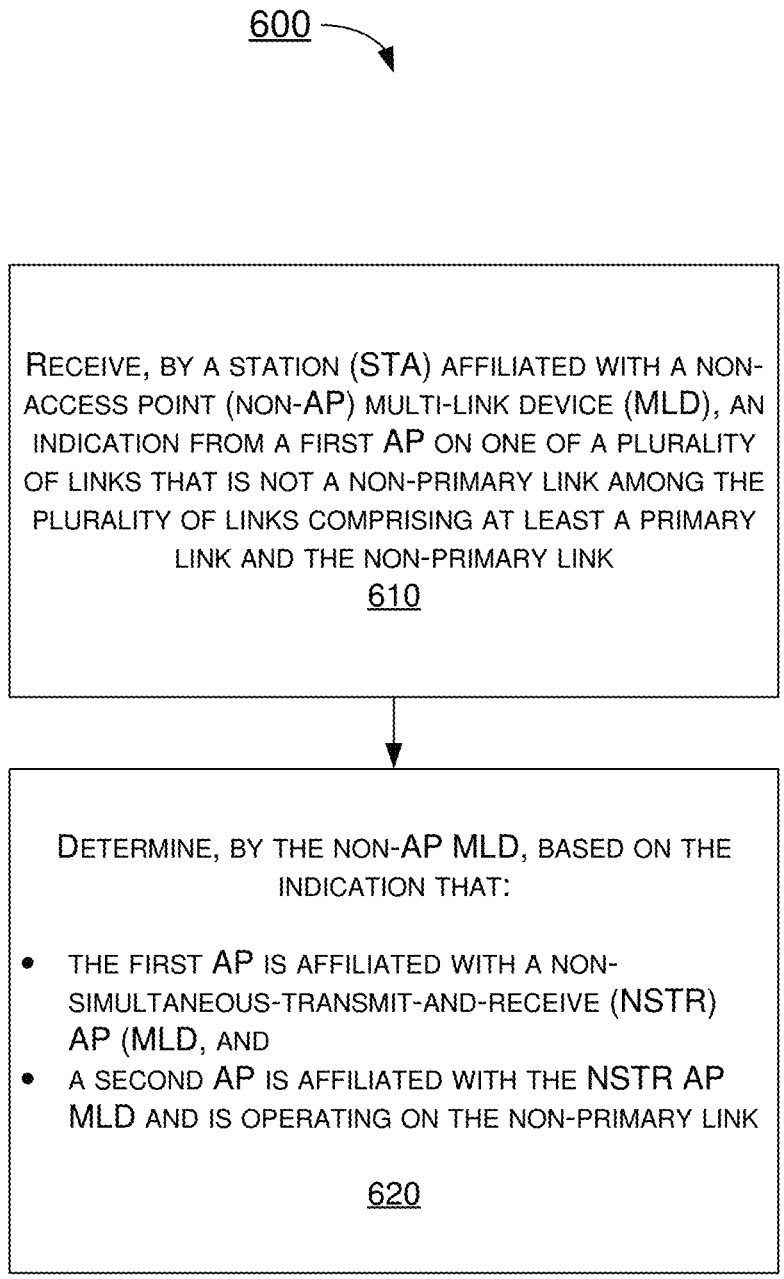
FIG. 6 is a flowchart of an example process in accordance with an implementation of the present disclosure.

FIG. 6 illustrates an example process 600 in accordance with an implementation of the present disclosure. Process 600 may represent an aspect of implementing various proposed designs, concepts, schemes, systems and methods described above. More specifically, process 600 may represent an aspect of the proposed concepts and schemes pertaining to system parameters transmission scheme in wireless communications in accordance with the present disclosure. Process 600 may include one or more operations, actions, or functions as illustrated by one or more of blocks 610 and 620. Although illustrated as discrete blocks, various blocks of process 600 may be divided into additional blocks, combined into fewer blocks, or eliminated, depending on the desired implementation. Moreover, the blocks/sub-blocks of process 600 may be executed in the order shown in FIG. 6 or, alternatively in a different order. Furthermore, one or more of the blocks/sub-blocks of process 600 may be executed repeatedly or iteratively. Process 600 may be implemented by or in apparatus 510 and apparatus 520 as well as any variations thereof. Solely for illustrative purposes and without limiting the scope, process 600 is described below in the context of apparatus 510 implemented in or as STA 110 and apparatus 520 implemented in or as STA 120 of a wireless network such as a WLAN in network environment 100 in accordance with one or more of IEEE 802.11 standards. It is noteworthy that, although examples described below are provide in the context of apparatus 510 implemented in a STA affiliated with a non-AP MLD (e.g., STA 110) and apparatus 520 implemented in a first AP affiliated with a NSTR AP MLD (e.g., STA 120). Process 600 may begin at block 610.

At 610, process 600 may involve processor 512 receiving, via transceiver 516, an indication from apparatus 520 (as a first AP) on one of a plurality of links that is not a non-primary link among the plurality of links comprising at least a primary link and the non-primary link. Process 600 may proceed from 610 to 620.

At 620, process 600 may involve processor 512 determining, based on the indication, that: (i) the first AP is affiliated with a NSTR AP MLD, and (ii) a second AP is affiliated with the NSTR AP MLD and is operating on the non-primary link.

In some implementations, in receiving the indication, process 600 may involve processor 512 receiving the indication in a beacon frame or a probe response frame.

In some implementations, in determining that the first AP is affiliated with the NSTR AP MLD, process 600 may involve processor 512 determining based on an indication in a common information field of the MLD contained in a Multi-Link element in the beacon frame or the probe response frame.

In some implementations, in determining that the second AP is affiliated with the NSTR AP MLD and is operating on the non-primary link, process 600 may involve processor 512 determining based on an indicator contained in a Neighbor Information field corresponding to the second AP in a Reduced Neighbor Report element in the beacon frame or the probe response frame. In some implementations, the indicator may include a value of a TBTT Information Field Type subfield being set to a specific value (e.g., 1). Alternatively, the indicator may include the value of the TBTT Information Field Length subfield being set to another specific value (e.g., 3 or 25). Still alternatively, the indicator may include a specific combined value of the TBTT Information Field Type subfield (e.g., 1) and a TBTT Information Field Length (e.g., 3, 4 or 9).

In some implementations, in determining that the second AP is affiliated with the NSTR AP MLD and is operating on the non-primary link, process 600 may involve processor 512 determining that the second AP is affiliated with the NSTR AP MLD and is operating on the non-primary link based on the TBTT Information Field with either or both of a specific TBTT Information Field Type and a specific TBTT Information Length subfield value.

In some implementations, process 600 may involve processor 512 performing additional operations. For instance, process 600 may involve processor 512 transmitting, via transceiver 516, a request to the first AP on the one of the plurality of links that is not the non-primary link. Moreover, process 600 may involve processor 512 receiving, via transceiver 516, from the first AP a complete or partial set of capabilities, parameters and operation elements of the second AP responsive to the transmitting of the request.

In some implementations, process 600 may involve processor 512 performing additional operations. For instance, process 600 may involve processor 512 receiving, via transceiver 516, from the first AP a BSS parameter critical update of the second AP indicating an occurrence of a critical update to BSS parameters of the second AP. Furthermore, process 600 may involve processor 512 maintaining a record of a value of a most recently received BSS Parameters Change Count subfield regarding the second AP affiliated with the NSTR AP MLD with which apparatus 510 is associated with the first AP thereof responsive to receiving the BSS parameter critical update.

In some implementations, process 600 may involve processor 512 refraining from sending any ML Probe Request to the second AP to obtain an updated BSS parameter critical update of the second AP in response to determining that the second AP is affiliated with the NSTR AP MLD and is operating on the non-primary link. Additionally, or alternatively, in receiving the BSS parameter critical update of the second AP, process 600 may involve processor 512 receiving the BSS parameter critical update responsive to transmitting a ML probe request to the first AP.

Figure 7:
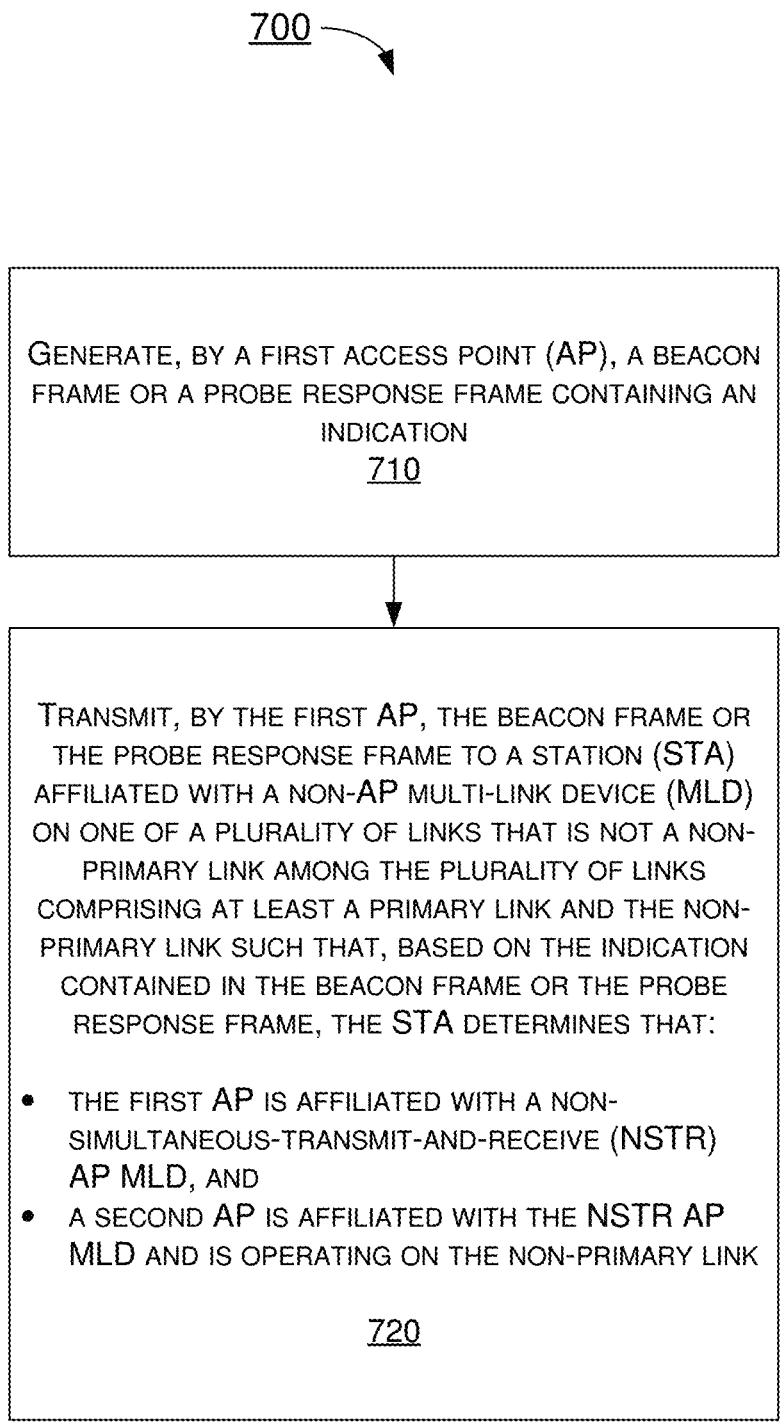
FIG. 7 is a flowchart of an example process in accordance with an implementation of the present disclosure.

FIG. 7 illustrates an example process 700 in accordance with an implementation of the present disclosure. Process 700 may represent an aspect of implementing various proposed designs, concepts, schemes, systems and methods described above. More specifically, process 700 may represent an aspect of the proposed concepts and schemes pertaining to system parameters transmission scheme in wireless communications in accordance with the present disclosure. Process 700 may include one or more operations, actions, or functions as illustrated by one or more of blocks 710 and 720. Although illustrated as discrete blocks, various blocks of process 700 may be divided into additional blocks, combined into fewer blocks, or eliminated, depending on the desired implementation. Moreover, the blocks/sub-blocks of process 700 may be executed in the order shown in FIG. 7 or, alternatively in a different order. Furthermore, one or more of the blocks/sub-blocks of process 700 may be executed repeatedly or iteratively. Process 700 may be implemented by or in apparatus 510 and apparatus 520 as well as any variations thereof. Solely for illustrative purposes and without limiting the scope, process 700 is described below in the context of apparatus 510 implemented in or as STA 110 and apparatus 520 implemented in or as STA 120 of a wireless network such as a WLAN in network environment 100 in accordance with one or more of IEEE 802.11 standards. It is noteworthy that, although examples described below are provide in the context of apparatus 510 implemented in a STA affiliated with a non-AP MLD (e.g., STA 110) and apparatus 520 implemented in a first AP affiliated with a NSTR AP MLD (e.g., STA 120). Process 700 may begin at block 710.

At 710, process 700 may involve processor 522 generating a beacon frame or a probe response frame containing an indication. Process 700 may proceed from 710 to 720.

At 720, process 700 may involve processor 522 transmitting, via transceiver 526, the beacon frame or the probe response frame to apparatus 510 (as a STA) affiliated with a non-AP MLD on one of a plurality of links that is not a non-primary link among the plurality of links comprising at least a primary link and the non-primary link such that, based on the indication contained in the beacon frame or the probe response frame, the STA determines that: (i) the first AP is affiliated with a NSTR AP MLD, and (ii) a second AP is affiliated with the NSTR AP MLD and is operating on the non-primary link.

In some implementations, the indication may include common information of the MLD contained in a Basic Variant Multi-Link element in the beacon frame or the probe response frame indicating that the first AP is affiliated with the NSTR AP MLD. Additionally, or alternatively, the indication may include an indicator contained in a Reduced Neighbor Report element in the beacon frame or the probe response frame indicating that the second AP is affiliated with the NSTR AP MLD and is operating on the non-primary link.

In some implementations, process 700 may involve processor 522 performing additional operations. For instance, process 700 may involve processor 522 receiving, via transceiver 526, a request from the STA on the one of the plurality of links that is not the non-primary link. Moreover, process 700 may involve processor 522 transmitting, via transceiver 526, to the STA a complete or partial set of capabilities, parameters and operation elements of the second AP responsive to the receiving of the request.

In some implementations, the indication may include an indicator contained in a Reduced Neighbor Report element in the beacon frame or the probe response frame. In some implementations, the indicator may include a value of a TBTT Information Field Type subfield being set to 1. Alternatively, the indicator may include the value of the TBTT Information Field Length subfield being set to 3 or 25. Still alternatively, the indicator may include the value of the TBTT Information Field Type subfield being set to 1 and a value of a TBTT Information Field Length being set to 3, 4 or 9.

In some implementations, process 700 may involve processor 522 performing additional operations. For instance, process 700 may involve processor 522 determining an occurrence of a critical update to a STA profile of the second AP. Furthermore, process 700 may involve processor 522 transmitting, via transceiver 526, to the STA a BSS parameter critical update indicating the occurrence of the critical update to a STA profile of the second AP.

In some implementations, in transmitting the BSS parameter critical update, process 700 may involve processor 522 transmitting the BSS parameter critical update in a BSS Parameters Change Count subfield in a Neighbor AP Information field of a Reduced Neighbor Report element regarding the second AP. Additionally, or alternatively, in transmitting the BSS parameter critical update, process 700 may involve processor 522 transmitting the BSS parameter critical update responsive to receiving a ML probe request from the STA.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   receiving, by a station (STA) affiliated with a non-access point (non-AP) multi-link device (MLD), an indication from a first AP on one of a plurality of links that is not a non-primary link among the plurality of links comprising at least a primary link and the non-primary link; and
   determining, by the non-AP MLD, based on the indication that:
      the first AP is affiliated with a non-simultaneous-transmit-and-receive (NSTR) AP MLD, and
      a second AP is affiliated with the NSTR AP MLD and is operating on the non-primary link,
   wherein the receiving of the indication comprises receiving the indication in a beacon frame or a probe response frame,
   wherein the determining that the second AP is affiliated with the NSTR AP MLD and is operating on the non-primary link comprises determining based on an indicator contained in a Neighbor Information field corresponding to the second AP in a Reduced Neighbor Report element in the beacon frame or the probe response frame, and
   wherein the indicator comprises a specific combined value of a Target Beacon Transmission Time (TBTT) Information Field Type subfield and a TBTT Information Field Length subfield.

2. The method of claim 1, wherein the determining that the first AP is affiliated with the NSTR AP MLD comprises determining based on an indication in a common information field of the MLD contained in a Multi-Link element in the beacon frame or the probe response frame.

3. The method of claim 1, further comprising:
   transmitting, by the STA, a request to the first AP on the one of the plurality of links that is not the non-primary link; and
   receiving, by the STA, from the first AP a complete or partial set of capabilities, parameters and operation elements of the second AP responsive to the transmitting of the request.

4. The method of claim 1, further comprising:
   receiving, by the STA, from the first AP a basic service set (BSS) parameter critical update of the second AP indicating an occurrence of a critical update to BSS parameters of the second AP; and
   maintaining, by the STA, a record of a value of a most recently received BSS Parameters Change Count subfield regarding the second AP affiliated with the NSTR AP MLD with which the STA is associated with the first AP thereof responsive to receiving the BSS parameter critical update.

5. The method of claim 4, wherein the receiving of the BSS parameter critical update of the second AP comprises receiving the BSS parameter critical update responsive to transmitting a multi-link (ML) probe request to the first AP.

6. The method of claim 1, further comprising:
   refraining, by the STA, from sending any Probe Request to the second AP to obtain an updated basic service set (BSS) parameter critical update of the second AP responsive to determining that the second AP is affiliated with the NSTR AP MLD and is operating on the non-primary link.

7. A method, comprising:
   generating, by a first access point (AP), a beacon frame or a probe response frame containing an indication; and
   transmitting, by the first AP, the beacon frame or the probe response frame to a station (STA) affiliated with a non-AP multi-link device (MLD) on one of a plurality of links that is not a non-primary link among the plurality of links comprising at least a primary link and the non-primary link,
   wherein, based on the indication contained in the beacon frame or the probe response frame, the STA determines that:
      the first AP is affiliated with a non-simultaneous-transmit-and-receive (NSTR) AP MLD, and
      a second AP is affiliated with the NSTR AP MLD and is operating on the non-primary link,
   wherein the indication comprises an indicator contained in a Neighbor Information field corresponding to the second AP in a Reduced Neighbor Report element in the beacon frame or the probe response frame, and
   wherein the indicator comprises a specific combined value of a Target Beacon Transmission Time (TBTT) Information Field Type subfield and a TBTT Information Field Length subfield.

8. The method of claim 7, wherein the indication comprises common information of the MLD contained in a Basic Variant Multi-Link element in the beacon frame or the probe response frame indicating that the first AP is affiliated with the NSTR AP MLD.

9. The method of claim 7, wherein the indication comprises an indicator contained in a Reduced Neighbor Report element in the beacon frame or the probe response frame indicating that the second AP is affiliated with the NSTR AP MLD and is operating on the non-primary link.

10. The method of claim 7, further comprising:
receiving, by the first AP, a request from the STA on the one of the plurality of links that is not the non-primary link; and
transmitting, by the first AP, to the STA a complete or partial set of capabilities, parameters and operation elements of the second AP responsive to the receiving of the request.

11. The method of claim 7, further comprising:
determining, by the first AP, an occurrence of a critical update to a STA profile of the second AP; and
transmitting, by the first AP, to the STA a basic service set (BSS) parameter critical update indicating the occurrence of the critical update to a STA profile of the second AP.

12. The method of claim 11, wherein the transmitting of the BSS parameter critical update comprises transmitting the BSS parameter critical update in a BSS Parameters Change Count subfield in a Neighbor AP Information field of a Reduced Neighbor Report element regarding the second AP.

13. The method of claim 11, wherein the transmitting of the BSS parameter critical update comprises transmitting the BSS parameter critical update responsive to receiving a multi-link (ML) probe request from the STA.

14. An apparatus, comprising:
a transceiver configured to communicate wirelessly; and
a processor coupled to the transceiver and configured to perform operations comprising:
in an event that the apparatus is implemented as a station (STA) affiliated with a non-access point (non-AP) multi-link device (MLD):
receiving, via the transceiver, an indication from a first AP on one of a plurality of links that is not a non-primary link among the plurality of links comprising at least a primary link and the non-primary link; and
determining based on the indication that:
the first AP is affiliated with a non-simultaneous-transmit-and-receive (NSTR) AP MLD, and
a second AP is affiliated with the NSTR AP MLD and is operating on the non-primary link, or
in an event that the apparatus is implemented in the first AP:
generating a beacon frame or a probe response frame containing the indication; and
transmitting, via the transceiver, the beacon frame or the probe response frame to another STA on one of the plurality of links that is not the non-primary link,
wherein the receiving of the indication comprises receiving the indication in a beacon frame or a probe response frame,
wherein the determining that the second AP is affiliated with the NSTR AP MLD and is operating on the non-primary link comprises determining based on an indicator contained in a Neighbor Information field corresponding to the second AP in a Reduced Neighbor Report element in the beacon frame or the probe response frame, and
wherein the indicator comprises a specific combined value of a Target Beacon Transmission Time (TBTT) Information Field Type subfield and a TBTT Information Field Length subfield.

* * * * *